United States Patent [19]

Jensen

[11] Patent Number: 4,753,978

[45] Date of Patent: Jun. 28, 1988

[54] CURABLE ORGANOSILOXANE COMPOSITIONS

[75] Inventor: Jary D. Jensen, Midland, Mich.

[73] Assignee: Dow Corning Corporation, Midland, Mich.

[21] Appl. No.: 89,107

[22] Filed: Aug. 25, 1987

[51] Int. Cl.$^4$ ............................................. C08L 83/04
[52] U.S. Cl. .................................... 524/862; 524/861; 525/478; 528/15; 528/31; 528/32
[58] Field of Search ............................. 528/15, 31, 32; 524/861, 862; 525/478

[56] References Cited

U.S. PATENT DOCUMENTS

| | | | |
|---|---|---|---|
| 3,671,480 | 6/1972 | Wada et al. | 260/29.1 |
| 3,884,866 | 5/1975 | Jeram et al. | 260/32.8 |
| 4,057,596 | 11/1977 | Takamizawa et al. | 260/825 |
| 4,162,243 | 7/1979 | Lee et al. | 260/37 |
| 4,539,357 | 9/1985 | Bobear | 524/267 |

FOREIGN PATENT DOCUMENTS 1269007  3/1972  United Kingdom .

*Primary Examiner*—Melvyn I. Marquis
*Attorney, Agent, or Firm*—Robert Spector

[57] ABSTRACT

The tear strength of cured organosiloxane elastomers can be increased without adversely affecting other physical properties if the composition used to prepare the elastomer is curable by a platinum-catalyzed hydrosilation reaction and contains a mixture of two liquid diorganovinylsiloxy terminated polydiorganosiloxanes, one of which constitutes from 70 to 95 percent by weight of said mixture and contains vinyl or other ethylenically unsaturated hydrocarbon radicals only at the terminal positions. The second polydiorganosiloxane contains both terminal vinyl radicals and from 1 to 5 mole percent of vinyl radicals on non-terminal repeating units.

6 Claims, No Drawings

CURABLE ORGANOSILOXANE COMPOSITIONS

BACKGROUND OF THE INVENTION

1. Field of the Invention

This invention relates to curable organosiloxane compositions. More particularly, this invention relates to organosiloxane compositions that can be transported by pumping and cured by a platinum-catalyzed hydrosilation reaction to form elastomers exhibiting superior physical properties, particularly tensile strength and tear strength, without sacrificing other desirable properties, such as hardness of the cured elastomer or processability of the curable composition.

2. Description of the Prior Art

Curable organosiloxane compositions containing at least one polydiorganosiloxane with at least two silicon-bonded vinyl radicals, an organohydrogensiloxane or organic peroxide curing agent and a silica filler are well known in the art pertaining to silicone elastomers. It is also known to improve the physical properties, particularly tensile and tear strengths, of cured elastomers prepared from these curable compositions by using two or more vinyl-containing polydiorganosiloxanes of different molecular weights or a single vinyl-containing polydiorganosiloxane having a bimodal molecular weight distribution.

British patent No. 1,269,007 that issued to Wada and Ito on Mar. 29, 1972 teaches peroxide curable compositions containing two polydiorganosiloxanes (1 and 2) each of which has at least 3000 diorganosiloxane units per molecule and a third polydiorganosiloxane containing from 10 to 1000 siloxane units per molecule. Three different vinyl-containing polydiorganosiloxanes are used to achieve high tear strength in the cured elastomer. Polymer 1 contains either no vinyl radicals or from 0.02 to 0.3 mole percent of vinyl radicals at either terminal or non-terminal positions in the molecule, polymer 2 contains from 5 to 20 mole percent of vinyl-containing siloxane units and polymer 3 contains from 5 to 90 percent of vinyl-containing siloxane units. The tensile strength of the cured elastomers are about 9800 kPa and the maximum tear strength value reported is 45 kilonewtons per meter (kN/m). The curable compositions would have the consistency of a gum.

U.S. Pat. No. 3,671,480, which issued on June 20, 1972 to the same inventors named on the aforementioned British patent, teaches organosiloxane compositions that cure by a platinum-catalyzed hydrosilation reaction to yield elastomers exhibiting high values of tear strength. These compositions contain two different vinyl-substituted polydiorganosiloxanes. The first of these polymers contains from 0.02 to 0.2 mole percent of vinyl-substituted siloxane units and an average of at least 3000 siloxane units per molecule, which is equivalent to a gum-type polydimethylsiloxane having a viscosity of at least 1000 Pa.s. The vinyl radicals of this polymer can be located on either terminal or non-terminal repeating units. In all of the exemplified compositions the aforementioned first polymer contains non-terminal vinyl radicals. The second polymer contains an average of at least 100 siloxane units per molecule and at least 2 mole percent of vinyl-substituted siloxane units.

In the exemplified compositions the first polydiorganosiloxane contains an average of from 6 000 to 10,000 repeating units and from 0.1 to 0.15 mole percent of methylvinylsiloxane units per molecule, and the second polydiorganosiloxane contains from 200 to 8000 repeating units per molecule and from 1 to 50 mole percent of methylvinylsiloxane units. The maximum tear strength value reported for a cured elastomer is 59.4 kN/m. and the tensile strength of this sample is 10094 kPa.

U.S. Pat. No. 4,057,596, which issued to Takamizawa et al. on Nov. 8, 1977 discloses anti-sticking coating compositions containing two vinyl-substituted polydiorganosiloxanes, one of which contains vinyl only at the terminal positions and exhibits a viscosity of from 30 to 5,000 centistokes. The second polydiorganosiloxane contains at least 3 vinyl radicals per molecule that can be at terminal or non-terminal positions and exhibits a viscosity of from 10 centistokes to the consistency of a gum. There is nothing in this patent suggesting addition of filler to obtain compositions useful for preparing elastomeric materials other than films.

U.S. Pat. No. 4,539,357, which issued to Bobear on Sept. 3, 1985 discloses peroxide cured organosiloxane compositions containing two different gum type vinyl-substituted polymers exhibiting viscosities of from 1000 to 200,000 Pa.s. One of these polymers contains from 0.005 to 0.1 mole percent of vinyl-substituted siloxane units and the second contains from 0.5 to 15 mole percent of these units, with the proviso that the relative concentration of the second polymer decreases as its vinyl content increases. The vinyl containing siloxane units of both polymers can be located at terminal or non-terminal positions within the molecule. Cured elastomers prepared using these compositions exhibit tear strengths in excess of 22 kN/m. The highest tear strength value reported in the examples is 66 kN/m. The tensile strength of this sample is 7341 kPa.

The composition described in the aforementioned Bobear patent have the consistency of a gum, are not readily processable in conventional injection molding equipment and are not capable of being transported by pumping under conventional pressures.

U.S. Pat. No. 3,884,866, which issued to Jeram and Striker on May 20, 1975 discloses curable organosiloxane compositions containing (A) 100 parts of a high viscosity component containing at least one vinyl-terminated polydiorganosiloxane having a viscosity of from 5,000 to 1,000,000 centipoise (5 to 1,000 Pa.s) at 25° C., and (B) from 5 to 40 parts of a low viscosity component containing at least one polydiorganosiloxane having a viscosity of from 50 to 5,000 centipoise (0.05 to 5 Pa.s) at 25° C. The curable compositions also contain an organohydrogensiloxane and a platinum hydrosilation catalyst. The structural formulae for ingredients (A) and (B) indicate that the non-terminal repeating units of both the high and low viscosity polymers can contain vinyl radicals, however none of the exemplified compositions contain vinyl radicals bonded to non-terminal repeating units The highest tear strength value reported for the cured elastomers prepared using these exemplified compositions is 250 pounds per inch (43.8 kN/m) and the highest tensile strength value is 1100 psi (7590 kPa.). The increase in tear strength and tensile strength is achieved at the cost of the hardness of the cured elastomer, as measured on the Shore A durometer scale. The reported durometer value for this sample is 45

U.S. Pat. No, 4,162 243, which issued to Lee et al. on July 24, 1979 discloses organosiloxane compositions that cure by the same mechanism disclosed in the aforementioned Jeram and Striker patent. Because of differences in the molecular weight distribution of the vinyl-containing polydiorganosiloxane described by Lee et al. and the vinyl-containing polydiorganosiloxanes of Jeram and Striker, cured elastomers prepared using the compositions of Lee et al. exhibit higher durometer hardness values using less silica filler, with a resultant decrease in the viscosity of the curable composition. This is achieved by the presence in the curable composition of Lee et al. of (1) a silica filler with vinyl-containing organosiloxane groups bonded to its surface and (2) a triorganosiloxy-terminated polydimethylsiloxane composition wherein the triorganosiloxy terminal groups are defined as dimethylvinylsiloxy or phenylmethylvinylsiloxy and the composition exhibits a specified molecular weight distribution and dispersity index. The required molecular weight distribution can be achieved using a single polydimethylsiloxane or a mixture of two or more polydimethylsiloxanes.

The triorganosiloxy terminated polydimethylsiloxanes present in the compositions of the aforementioned Lee et al. patent by definition exclude the presence of ethylenically unsaturated hydrocarbon radicals in any non-terminal repeating unit.

The elastomers prepared by curing the compositions exemplified in the Lee et al. patent exhibit considerably lower tear strength values (35 kN/m) than the maximum value of 43.8 kN/m reported by Jeram et al. and the 66 kN/m reported in the aforementioned Bobear patent, however the maximum durometer hardness values of 62 and 65 measured on the Shore A scale, are considerably higher than the values reported by Jeram et al.

SUMMARY OF THE INVENTION

An objective of this invention is to define a class of organosiloxane compositions that can be cured to yield elastomers exhibiting the combination of high tear and tensile strengths in addition to a durometer hardness value, measured on the shore A scale, of at least 45. A preferred class of the present compositions are "extrudable" as defined in the aforementioned Lee et al. patent. Specifically, the compositions can be extruded at a rate of at least 20 grams per minute through a 3.175 millimeter-diameter orifice under a pressure of 620 kilopascals (kPa) at 25° C.

The present inventor has discovered that the aforementioned objective can be achieved using a curable composition comprising a mixture of two liquid polydiorganosiloxanes, both of which have diorganovinylsiloxy terminal units. One of these is substantially free of non-terminal vinyl-substituted diorganosiloxane units and the second contains from 1 to 5 mole percent of these units. These compositions are cured using a platinum-catalyzed hydrosilation reaction.

DETAILED DESCRIPTION OF THE INVENTION

This invention provides a curable organosiloxane composition comprising the product obtained by mixing to homogeniety A. from 70 to 95 weight percent, based on the total weight of (A) and (B), of a first diorganovinylsiloxy terminated polydiorganosiloxane exhibiting a viscosity of from 20 to 200 Pa.s at 25° C. and containing essentially no ethylenically unsaturated hydrocarbon radicals bonded to non-terminal silicon atoms.

B. from 5 to 30 weight percent, based on the total weight of (A) and (B), of a second diorganovinylsiloxy terminated polydiorganosiloxane that is miscible with said first polydiorganosiloxane and exhibits a viscosity of from 0.1 to 200 Pa.s at 25° C. where from 1 to 5 mole percent of the non-terminal repeating units of said second diorganovinylsiloxy-terminated polydiorganosiloxane contain a vinyl radical, C. an amount sufficient to cure said composition of an organohydrogensiloxane that is miscible with (A) and (B), and contains an average of more than two silicon bonded hydrogen atoms per molecule, D. a platinum hydrosilation catalyst in an amount sufficient to promote curing of said composition at a temperature of from ambient to 250° C. and E. from 10 to 60 weight percent, based on the weight of said composition, of a reinforcing silica filler.

1 The Vinyl-Containing Polydiorganosiloxanes

The inventive features considered responsible for the unique combination of physical properties exhibited by elastomers prepared from the present curable composition are 1) the presence in the composition of two miscible diorganovinylsiloxy-terminated polydiorganosiloxanes the first of which, referred to hereinafter as ingredient A, contains vinyl or other ethylenically unsaturated radicals only at the terminal positions of the molecule and is present at a higher concentration than the second of the two diorganovinylsiloxy-terminated polydiorganosiloxanes, referred to hereinafter as ingredient B, and 2) the presence in ingredient B of vinyl radicals on from 1 to 5 mole percent of the non-terminal repeating units.

Experimental data contained in the accompanying examples demonstrate that the physical properties of the cured elastomer are adversely affected when vinyl radicals are present in the non-terminal units of ingredient A or the concentration of non-terminal vinyl radicals in ingredient B is outside the present limits of from 1 to 5 mole percent of the non-terminal repeating units.

The term "essential absence of non-terminal ethylenically unsaturated radicals" used to describe ingredient A means that the only ethylenically unsaturated hydrocarbon radicals present on the non-terminal silicon atoms of this ingredient result from impurities present in the reactants used to prepare ingredient A or from undesired rearrangements occurring during preparation of this ingredient.

Ingredient A is a liquid diorganovinylsiloxy-terminated polydiorganosiloxane, and can be represented by the average general formula

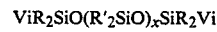

$ViR_2SiO(R'_2SiO)_xSiR_2Vi$ where Vi represents a vinyl radical. R and R' are individually monovalent hydrocarbon radicals or substituted monovalent hydrocarbon radicals. R and R' are substantially free of ethylenic unsaturation, and x represents a degree of polymerization equivalent to a viscosity of from 20 to 200 Pa.s at 25° C. In preferred embodiments the viscosity of ingredient A is from 40 to 70 Pa.s.

The R and R' radicals bonded to the silicon atoms of ingredient A contain from 1 to 20 carbon atoms and can be identical or different. Because ingredient A is a liquid at 25° C., at least one of the R' radicals on each of the non-terminal silicon atoms is lower alkyl, most preferably methyl. The remaining R' radical can be alkyl such as methyl or ethyl; substituted alkyl such as chloromethyl, 3-chloropropyl or 3,3,3-trifluoropropyl; cycloalkyl such as cyclohexyl; or aryl such as phenyl. Most preferably any R and R' radicals other than methyl are phenyl or 3,3,3-trifluoropropyl, this preference being based on the availability of the intermediates used to prepare these polydiorganosiloxanes and the properties of cured elastomers prepared by curing compositions containing these polymers.

Methods for preparing the liquid polydiorganosiloxanes used as ingredients A and B of the present compositions by hydrolysis and condensation of the corresponding halosilanes or cyclic polydiorganosiloxanes are sufficiently disclosed in the patent and other literature that a detailed description of preparative methods in this specification is not necessary.

Ingredient B is a liquid diorganovinylsiloxy-terminated polydiorganosiloxane and can be represented by the average general formula

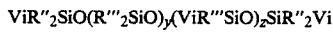

ViR″₂SiO(R‴₂SiO)ᵧ(ViR‴SiO)₂SiR″₂Vi

In this formula Vi represents a vinyl radical and R″ and R‴ are selected from the same group of monovalent hydrocarbon radicals and substituted monovalent substituted hydrocarbon radicals as R and R′. Because ingredients A and B should be miscible with one another, the silicon bonded hydrocarbon radicals present in these ingredients should be selected from the same class, e.g. lower alkyl. These hydrocarbon radicals are preferably identical.

The degree of polymerization represented by the sum of y and z is equivalent to a viscosity of from 0.1 to 200 Pa.s, preferably from 0.1 to 20 Pa.s, and the ratio z/(y+z) is from 0.01 to 0.05, which specifies the requirement for this ingredient that from 1 to 5 mole percent of the non-terminal repeating units contain a vinyl radical. The degree of polymerization of Ingredient B is preferably less than the degree of polymerization of Ingredient A.

Preferred embodiments of ingredient A and B include but are not limited to dimethylvinylsiloxy-terminated polydimethylsiloxanes, dimethylvinylsiloxy-terminated-polymethyl-3,3,3-trifluoropropylsiloxanes, dimethylvinylsiloxy-terminated -dimethylsiloxane/3,3,3-trifluoropropylmethylsiloxane copolymers and dimethylvinylsiloxy-terminated-dimethylsiloxane/methylphenylsiloxane copolymers.

To achieve high tear strength without adversely affecting other physical properties of the cured elastomer ingredient B constitutes from 5 to 30 percent, preferably from 5 to 15 percent, of the combined weight of ingredients A and B. Compositions containing more than about 30 percent by weight of ingredient B yield elastomers with too high a degree of crosslinking, resulting in reduced values of elongation, tear strength and tensile strength. Less than about 5 percent by weight of ingredient B will not provide the desired high level of tear strength.

2. The Organohydrogensiloxane Curing Agent

The organosiloxane compositions of this invention are cured by a platinum catalyzed hydrosilation reaction. The curing agent is an organohydrogensiloxane containing an average of more than two silicon bonded hydrogen atoms per molecule. The organohydrogensiloxane contains from as few as four silicon atoms per molecule up to an average of 20 or more, and can have a viscosity of up to 10 Pa.s or higher at 25° C. The repeating units of this ingredient include but are not limited to HSiO₁.₅, R*HSiO and/or R*₂HSiO₀.₅ in addition to one or more of monoorganosiloxy, diorganosiloxane, triorganosiloxy and SiO₄/₂ units. In these formulae R* represents a monovalent hydrocarbon or halocarbon radical as defined hereinabove for the R radical of ingredient A.

Alternatively the organohydrogensiloxane can be a cyclic compound containing diorganosiloxane and organohydrogensiloxane units or a compound of the formula Si(OSiR*₂H)₄.

For those embodiments of the present composition wherein the hydrocarbon radicals of ingredients A and B, represented by R′, R″ and R‴, are methyl, R* is methyl and the curing agent is preferably a linear trimethylsiloxy terminated dimethylsiloxane/methylhydrogensiloxane copolymer containing an average of from 10 to about 50 repeating units per molecule, of which from 3 to 5 are methylhydrogensiloxane.

The molar ratio of silicon bonded hydrogen atoms to vinyl or other ethylenically unsaturated hydrocarbon radicals in compositions curable by a hydrosilation reaction is critical with respect to the properties of the cured elastomer. The optimum ratio for the present curable compositions will be determined at least in part by the molecular weights of ingredients A and B, the type of curing agent and the concentration of any resinous organosiloxane copolymer described hereinafter. This optimum value can readily be determined by those skilled in the art with a minimum of experimentation, and is not part of this invention.

For preferred compositions of this invention the molar ratio of silicon bonded hydrogen atoms to vinyl and other ethylenically unsaturated hydrocarbon radicals is between 1 and 2.

3. The Platinum Hydrosilation Catalyst and Optional Inhibitor

Hydrosilation reactions are typically conducted in the presence of a catalyst that is a platinum group metal or a compound of such a metal. Platinum compounds such as hexachloroplatinic acid, and particularly complexes of these compounds with relatively low molecular weight vinyl-containing organosiloxane compounds are preferred catalysts because of their high activity and compatibility with the organosiloxane reactants. These complexes are described in U.S. Pat. No. 3,419,593 that issued to David N. Willing on Dec. 31, 1968. Complexes with low molecular weight organosiloxanes wherein the silicon bonded hydrocarbon radicals are vinyl and either methyl or 3,3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures of the aforementioned vinyl-containing reactants, curing agents and platinum-containing catalysts may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

4. The Silica Filler

To achieve the high levels of tear strength and other physical properties that characterize cured elastomers prepared using the compositions of this invention, the compositions must contain a reinforcing silica filler. The filler is typically treated with any of the known silica treating agents to prevent a phenomenon referred to as "creping" or "crepe hardening" during processing of the curable composition.

Any finely divided form of silica can be used as the reinforcing filler. Colloidal silicas are preferred because of their relatively high surface area, which is typically at least 50 square meters per gram. Fillers having surface areas of at least 300 square meters per gram are preferred for use in the present compositions. Colloidal silicas can be prepared by precipitation or a fume process. Both of these preferred types of silica are commercially available.

The amount of finely divided silica used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The silica treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the silica to form compounds with silicon-bonded hydroxyl groups. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica particles to reduce interaction between these particles.

5. Optional Ingredients

In addition to the vinyl-containing polydiorganosiloxanes, curing agent, catalyst and silica filler the organosiloxane compositions of this invention can contain one or more additives that are conventionally present in curable compositions of this type. These materials are added to impart or enhance certain properties of the cured elastomer or facilitate processing of the curable composition.

Typical additives include but are not limited to pigments, dyes, adhesion promoters, flame retardants, heat and/or ultraviolet light stabilizers and resinous organosiloxane copolymers to enhance the physical properties of the cured elastomer.

A preferred type of resinous copolymer contains repeating units of the general formula $SiO_{4/2}$ in addition to triorganosiloxy units of the general formulae $R^1_3SiO_{1/2}$ and diorganovinylsiloxy units of the general formula $CH_2=CH(R^2)_2SiO_{1/2}$. In these formulae $R^1$ and $R^2$ are individually monovalent hydrocarbon or substituted monovalent hydrocarbon radicals as previously defined for the $R'$ and $R''$ radicals of the ingredients A and B.

The molar ratio of the combination of triorganosiloxy units and diorganovinylsiloxy units to $SiO_{4/2}$ units in the resinous copolymer is from 0.7 to 1.2, inclusive. The vinyl-containing units constitute from 2 to 8 percent by weight of the copolymer, which preferably contains at least two vinyl radicals per molecule. In preferred embodiments of the copolymer the ranges for the molar ratio of diorganovinylsiloxy: triorganosiloxy:$SiO_{4/2}$ units is 0.08-0.1:0.06-1:1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane capping agent than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane or a hexaorganodisiloxane wherein each silicon atom contains a vinyl radical and two methyl or other hydrocarbon radicals represented by $R^1$ and $R^2$ in the foregoing formula.

6. Preparation of Curable Compositions

The silica filler can be treated in the presence of at least a portion of the other ingredients of the present compositions by blending these ingredients together until the filler is completely treated and uniformly dispersed throughout the composition to form a homogeneous material. The ingredients that are present during treatment of the silica typically include the treating agents and at least a portion of the polydiorganosiloxanes referred to herein as ingredients A and B. Because silica treatment is typically carried out at temperatures above ambient, the organohydrogensiloxane and platinum-containing catalyst are typically added after treatment of the silica has been completed.

Irrespective of the type of mixer used, blending of the silica, filler treating agent(s), ingredients A and optionally, ingredient B is continued while the composition is heated at temperatures from about 100 to 250° C. under reduced pressure to remove volatile materials. The resultant product is then cooled prior to being blended with the organohydrogensiloxane (Ingredient C) and/or the platinum catalyst (Ingredient D), depending upon whether it is desired to prepare a one-part or two-part curable composition of this invention. The optional additives referred to hereinbefore can be added at this time or during blending of the silica with ingredient A.

In-situ treatment of the silica can require anywhere from 15 minutes to 2 hours, depending upon the amount of material being processed, the viscosity of the material and the shear rate to which the material is subjected during processing.

Alternatively, treatment of the silica can occur before the silica is blended with other ingredients of the present compositions. Methods for treating finely divided silica fillers prior to incorporating the silica into a polyorganosiloxane composition are known in the art.

To ensure adequate blending of all ingredients the mixing equipment in which the present compositions are prepared should be capable of subjecting the composition to a high rate of shear. The advantage of using this type of a "high intensity" mixer to prepare silica filled polyorganosiloxane compositions is taught in U.S. Pat. No. 3,690,804, which issued to Minuto on June 1, 1976. In accordance with the disclosure of this patent, the tip of the stirring device in the mixer is rotated at a speed of from 25 to about 250 feet per second, which would generate considerable shearing forces. The exemplified compositions are blended in a Henschel high intensity mixer wherein the rotor was operated at a speed of 3800 revolutions per minute, equivalent to a rotor tip speed of 157 feet per second.

Dough type mixers equipped with "sigma" shape blades, are not as efficient as mixers wherein the mixing surfaces are of a relatively flat "paddle" configuration. Examples of the paddle type mixers include the Henschel mixer disclosed in the aforementioned Minuto patent and certain mixers manufactured by Neulinger A. G. The blade is preferably rotated at a speed of at least 100 revolutions per minute.

Curable compositions prepared using the present method typically exhibit viscosities of about 0.5 up to about 1000 Pa.s at 25° C. To facilitate blending and transfer of the compositions and minimize entrapment of air during mixing a viscosity of less than about 10 Pa.s at 25° C. is preferred, particularly for extrudable compositions.

7. Fabrication and Curing of Shaped Articles

The present curable compositions can be formed into shaped articles by press molding, injection molding, extrusion, or any of the other methods used to fabricate organosiloxane compositions.

In the absence of one of the aforementioned catalyst inhibitors the compositions will cure at ambient temperature over a period of several hours or days, or within in several minutes when heated at temperatures of up to 250 degrees C. Compositions containing one of these catalyst inhibitors are typically cured by heating them for several minutes at temperatures of from 50 to about 250° C. A preferred range is from 100 to 200° C.

As discussed hereinbefore cured elastomeric articles prepared using the curable compositions of this invention exhibit tear strengths above about 240 pounds per inch (42 kN/m) and tensile strengths above 9300 kPa without any adverse effect on the other desirable properties of the cured elastomer or the extrudability of the composition from which it is formed. This unique combination of properties make the elastomers desirable for a number of end use applications, including gaskets and other fabricated articles wherein at least a portion of the article is relatively thin and subjected to large amounts of stress. Articles of this type include diaphragms and bladders.

The following example describes preferred curable compositions of this invention and the properties of elastomers prepared by curing these compositions. The example is intended to illustrate the present invention and should not be interpreted as limiting the invention as defined in the accompanying claims. Unless indicated to the contrary all parts and percentages are by weight and all viscosities were measured at 25° C.

EXAMPLE

Curable organosiloxane compositions were prepared by blending to homogeniety in a dough type mixer the entire quantity of a fume silica having a nominal surface area of 250 $m^2$ per gram (ingredient E), two filler treating agents described hereinafter, water and an amount of a dimethylvinylsiloxy endblocked polydimethylsiloxane having a viscosity of about 50 Pa.s at 25° C. (ingredient A) equal to 1.3 times the weight of the filler. This mixture was heated for one hour by circulating steam through the jacket of the mixer while volatile materials were removed under reduced pressure. Following completion of the heating cycle the remaining portion of ingredient A was added together with the entire amount of one of 4 different embodiments of ingredient B that are within the scope of this invention and 2 that are not. These embodiments are described hereinafter. These resultant compositions were then blended to homogeniety under ambient conditions. Two-part curable compositions were prepared by dividing this product into 2 equal parts.

One of these parts was combined with (1) a trimethylsiloxy terminated polydiorganosiloxane having an average of five methylhydrogensiloxane units, three dimethylsiloxane units per molecule and containing from 0.7 to 0.8 weight percent of silicon-bonded hydrogen atoms as the curing agent (ingredient C) and (2) 0.05 parts of methylbutynol as a platinum catalyst inhibitor (ingredient F). The amount of ingredient C was equivalent to a molar ratio of silicon bonded hydrogen atoms to vinyl radicals in the total curable composition of 1.8.

The second part of the product from the silica treatment operation was combined with a reaction product of hexachloroplatinic acid and sym-tetramethyldivinyldisiloxane that had been diluted with a liquid dimethylsiloxy terminated polydimethylsiloxane in an amount sufficient to achieve a platinum content of 0.7 weight percent (ingredient D), based on the weight of both parts of the curable composition.

Four embodiments of ingredient B corresponding to the present invention were used in the compositions.

Ingredient B1 was a dimethylvinylsiloxy terminated dimethylsiloxane/methylvinylsiloxane copolymer exhibiting a viscosity of 10 Pa.s and containing 1 mole percent of methylvinylsiloxane units.

Ingredient B2 was a dimethylvinylsiloxy terminated dimethylsiloxane/methylvinylsiloxane copolymer exhibiting a viscosity of 10 Pa.s and containing 3 mole percent of methylvinylsiloxane units.

Ingredient B3 was a dimethylvinylsiloxy terminated dimethylsiloxane/methylvinylsiloxane copolymer containing 5 mole percent of methylvinylsiloxy units and exhibiting a viscosity of 10 Pa.s.

Ingredient B4 was a is a dimethylvinylsiloxy terminated dimethylsiloxane/methylvinylsiloxane copolymer exhibiting a viscosity of 0.3 Pa.s and containing 2 mole percent of methylvinylsiloxane units.

For comparative purposes a dimethylvinylsiloxy terminated polydimethylsiloxane containing no methylvinylsiloxane units and exhibiting a viscosity of 0.45 Pa.s (ingredient B5) and a liquid dimethylvinylsiloxy terminated dimethylsiloxane/methylvinylsiloxane copolymer exhibiting a viscosity of about 16 Pa.s containing 22 mole percent of methylvinylsiloxane units (ingredient B6) were used in place of an ingredient B of this invention containing from 1 to 5 mole percent of methylvinylsiloxane units. The combination of ingredient B5 with ingredient A provided a molecular weight distribution for vinyl-containing polydimethylsiloxanes that is within the range taught and claimed in U.S. Pat. No. 4,162,243, issued to Lee et al. on July 24, 1979.

The silica treating agents were (1) 1.0 part of a hydroxyl terminated diorganosiloxane copolymer wherein the repeating units consist essentially of dimethylsiloxane and methylvinylsiloxane units and the copolymer contains about 10 weight percent of vinyl radical and about 16 weight percent of hydroxyl radicals; and (2) hexamethyldisilazane, used at a level of 8.9 parts in all but one of the formulations as specified in the following Table 1.

The amount of water added to each of the compositions during treatment of the silica was 1.9 parts.

Curable compositions were prepared by combining and mixing to homogeniety the two parts of each formulation. These compositions were cured in the form of sheets having a thickness of 1.9 mm. by placing the compositions in a hydraulic press and heating them for 5 minutes at a temperature of 150° C. Test samples were then cut from each of the sheets to determine the physical properties of the cured materials.

The American Society of Testing and Materials (ASTM) test methods used to measure the various properties evaluated included ASTM-412 for tensile strength and elongation. ASTM-D625, Die B for tear strength and ASTM-D2240, Shore A scale for durometer hardness values.

Table 1 summarizes the amounts of ingredients A, B, C and E present in each of the compositions evaluated. The physical properties of the cured compositions are summarized in Table 2.

TABLE 1

| Sample No. | A | B | C | E | Mole % MeViSiO in B |
|---|---|---|---|---|---|
| 1* | 73.3 | 26.7 (B1) | 2.66 | 44 | 1.0 |
| 2 | 95.0 | 5.0 (B2) | 1.51 | 40 | 3.0 |
| 3 | 90.0 | 10.0 (B2) | 2.39 | 40 | 3.0 |
| 4 | 85.0 | 15.0 (B2) | 3.45 | 40 | 3.0 |
| 5 | 94.3 | 5.7 (B3) | 2.66 | 44 | 5.0 |
| 6 | 90.0 | 10.0 (B4) | 2.40 | 40 | 2.0 |
| 7** | 90.0 | 10.0 (B5) | 2.40 | 40 | 0.0 |
| 8** | 98.75 | 1.25 (B6) | 2.65 | 44 | 22 |

*The amount of hexamethyldisilazane was 9.8 parts
**Included for comparative purposes

TABLE 2

| Sample No. | Tensile Strength (kPa) | Elongation (%) | Tear Strength kN/m | Hardness (Shore A) |
|---|---|---|---|---|
| 1 | 8397 | 341 | 41.5 | 55 |
| 2 | 10,136 | 590 | 38.5 | 48 |
| 3 | 9183 | 481 | 46.3 | 52 |
| 4 | 8439 | 364 | 52.6 | 58 |
| 5 | 10,191 | 580 | 40.6 | 53 |
| 6 | 7266 | 414 | 43.8 | 47 |
| 7* | 8473 | 394 | 26.1 | 53 |
| 8* | 9032 | 558 | 28.4 | 50 |

*Included for purposes of comparison

The data in Table 2 demonstrate that by using the curable compositions of this invention one is able to substantially improve the tear strength of cured elastomers relative to prior art elastomers prepared using extrudable organosiloxane compositions without adversely affecting other desirable properties of the cured elastomer such as tensile strength, hardness and elongation.

That which is claimed is:

1. A curable organosiloxane composition comprising the product obtained by mixing to homogeniety
   A. from 70 to 95 weight percent, based on the total weight of (A) and (B), of a first diorganovinylsiloxy terminated polydiorganosiloxane exhibiting a viscosity of from 20 to 200 Pa.s at 25° C. and containing essentially no ethylenically unsaturated hydrocarbon radicals bonded to non-terminal silicon atoms,
   B. from 5 to 30 weight percent, based on the total weight of (A) and (B), of a second diorganovinylsiloxy terminated polydiorganosiloxane that is miscible with said first polydiorganosiloxane and exhibits a viscosity of from 0.1 to 200 Pa.s at 25° C., where from 1 to 5 percent of the non-terminal repeating units of said second diorganovinylsiloxy-terminated polydiorganosiloxane contain a vinyl radical
   C. an amount sufficient to cure said composition of an organohydrogensiloxane that is miscible with (A) and (B), and contains an average of more than two silicon bonded hydrogen atoms per molecule,
   D. a platinum hydrosilation catalyst in an amount sufficient to promote curing of said composition at a temperature of from ambient to 250° C., and
   E. from 10 to 60 weight percent, based on the weight of said composition, of a treated reinforcing silica filler.

2. A composition according to claim 1 where said first diorganovinylsiloxy terminated polydiorganosiloxane (A) is represented by the average general formula $$ViR_2SiO(R'_2SiO)_xSiR_2Vi$$

where Vi represents a vinyl radical, R and R' are individually monovalent hydrocarbon radicals or substituted monovalent hydrocarbon radicals, and contain from 1 to 20 carbon atoms R and R' are substantially free of ethylenic unsaturation, and x represents a degree of polymerization equivalent to a viscosity of from 20 to 200 Pa.s at 25° C. and said second diorganovinylsiloxy terminated polydiorganosiloxane is represented by the average general formula

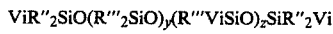
$ViR''_2SiO(R'''_2SiO)_y(R'''ViSiO)_zSiR''_2Vi$ where Vi represents a vinyl radical and R'' and R''' are selected from the same group of monovalent hydrocarbon radicals and substituted monovalent substituted hydrocarbon radicals as R and R', the degree of polymerization represented by the sum of y and z is equivalent to a viscosity of from 0.1 to 200 Pa.s, and the ratio z/(y+z) is from 0.01 to 0.05.

3. A composition according to claim 2 where at least 50 percent of the radicals represented by R, R', R'' and R''' are methyl and any remaining radicals are selected from the group consisting of phenyl and 3,3,3-trifluoropropyl.

4. A composition according to claim 3 where R, R', R'' and R''' are methyl, the viscosity of said first polydiorganosiloxane (A) is from 40 to 70 Pa.s at 25° C., the viscosity of said second polydiorganosiloxane (B) is from 0.1 to 20 Pa.s at 25° C., said first polydiorganosiloxane constitutes from 85 to 95 percent of the combined weight of said first and second polydiorganosiloxanes, and said organohydrogensiloxane (C) is a trimethylsiloxy terminated dimethylsiloxane/methylhydrogensiloxane copolymer.

5. A composition according to claim 4 where the molar ratio of the silicon bonded hydrogen atoms present in said organohydrogensiloxane and all of the vinyl or other ethylenically unsaturated hydrocarbon radicals present in said composition is from 1 to 2 and said reinforcing filler is treated with an anti-creping agent during preparation of said composition.

6. A composition according to claim 1 where said composition is extrudable and exhibits a viscosity of less than 10 Pa.s at 25° C.

* * * * *